(No Model.)
R. L. SHAW.
ROOT EXTRACTOR.
No. 367,555. Patented Aug. 2, 1887.
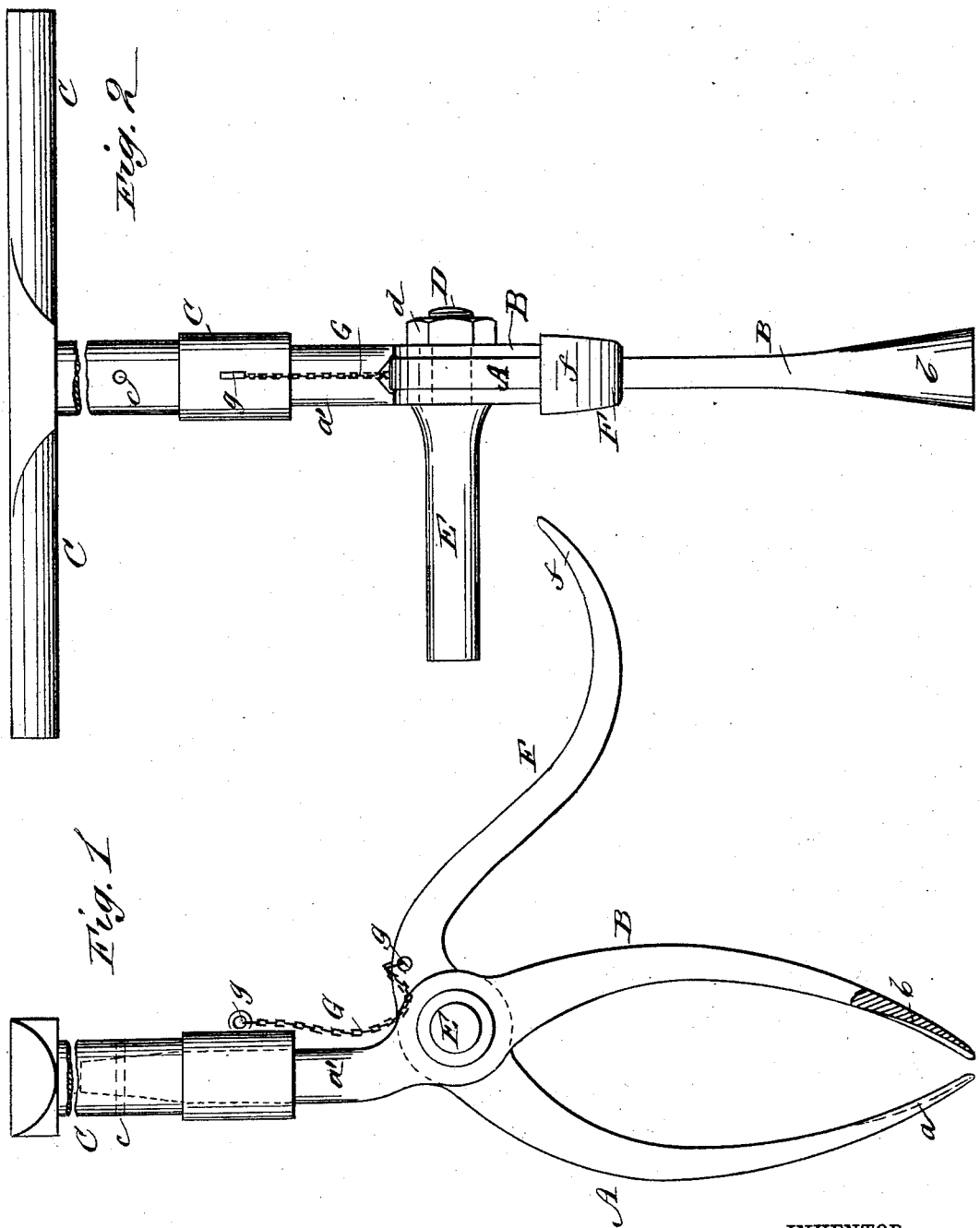
WITNESSES:
C. Neveux
C. Sedgwick
INVENTOR:
R. L. Shaw
BY Munn & Co.
ATTORNEYS.

UNITED STATES PATENT OFFICE.

ROBERT LEMUEL SHAW, OF FRANKLIN, PENNSYLVANIA.

ROOT-EXTRACTOR.

SPECIFICATION forming part of Letters Patent No. 367,555, dated August 2, 1887.

Application filed November 27, 1886. Serial No. 220,060. (No model.)

*To all whom it may concern:*

Be it known that I, ROBERT LEMUEL SHAW, of Franklin, in the county of Venango and State of Pennsylvania, have invented a new and Improved Root-Extractor, of which the following is a full, clear, and exact description.

My invention relates to an implement intended for pulling roots and weedy or other undesirable growths from lands under cultivation; and the invention has for its object to provide a simple, inexpensive, substantial, and efficient implement of this character, whereby the roots may be extracted with economy of time and labor.

The invention consists in certain novel features of construction and combinations of parts of the root-extractor, all as hereinafter fully described and claimed.

Reference is to be had to the accompanying drawings, forming a part of this specification, in which similar letters of reference indicate corresponding parts in both the figures.

Figure 1 is a side elevation of my improved root-extractor, partly broken away and in section; and Fig. 2 is a rear view of the implement.

The root-extractor consists, mainly, of two grasping jaws, A B, and a stock or handle, C, to which they are connected. The jaws A B are pivoted together by a strong bolt, D, which passes through the jaws where the jaw A passes through a slot in the jaw B, after the manner of a hand punch or nippers, and a nut, $d$, screwed onto the bolt holds the jaws together. The head of the bolt D is prolonged laterally to form a foot rest or treadle, E, to be used for pressing the jaws into the earth, as hereinafter explained. The shank $a'$ of the jaw B extends upward and into a ferruled stock or handle, C, which may be of any preferred length—say two feet or more—and a pin, $c$, passed through the handle and shank $a'$ holds both the jaws A B securely to the handle. The shank or upper part of the jaw A extends backward, and is curved or rounded, with its convex face downward, to form a fulcrum-bar, F, which is broadened toward its upturned extremity $f$, as shown in Fig. 2, to give it a more solid bearing on the ground surface. The extremities $a$ $b$ of the jaws A B also are broadened, and are dished or concaved transversely at their opposing faces to give them a better hold on the roots, weeds, or plants to be pulled.

A chain, G, connected at opposite ends, $g$ $g$, to the handle C and the inner end of the fulcrum-bar F, governs or limits the extent to which the points of the jaws A B may be opened to grasp an object, and by adjusting the connection of the chain to lengthen or shorten it the extent of opening of the jaws may be regulated at will for greater convenience in operating the implement.

In using the extractor the ends $a$ $b$ of the jaws A B will be set one at each side of a root or plant to be pulled, and by pressure of the foot of the operator on the treadle-bar E the jaws will be driven into the earth until the fulcrum-bar F touches or nearly touches the ground surface, whereupon the handle or stock C will be swung down to press the bar F against the ground and rock the entire implement on said bar as a fulcrum, and whereby the plant or root will be pulled from the earth very quickly and with little labor compared with that required by ordinary digging processes.

It will be noticed that the chain G prevents opening of the jaws farther than the desired distance or width necessary to grasp the root of the plant while the jaws are being driven into the earth by pressure on the treadle; hence no attention need be given the jaws after they are once opened to the limit prescribed by the chain; consequently the implement may be operated successfully by ordinary farm or other laborers, and will be found very useful in clearing lands of thistles, dock, or other weedy or undesirable growth, whereby the proper and easy cultivation of lands will be promoted.

Instead of fitting the jaw A into a slot in the jaw B, as above described, the two jaws may be laid flat across each other and be riveted together, like a blacksmith's tongs, and this may be the preferred manner of making the extractor, as it involves less expense, as will readily be understood.

Having thus described my invention, what I claim as new, and desire to secure by Letters Patent, is—

1. The combination, in a root-extractor, of two pivoted jaws, as A B, having a suitable handle or stock, one of said jaws formed with a fulcrum-bar extension, as F, and a treadle-bar projecting from the tool at an angle with the plane of opening and closing movement of the jaws, substantially as herein set forth.

2. The combination, in a root-extractor, of two jaws, as A B, having a suitable handle or stock and pivoted together at D, one of said jaws formed with a fulcrum-bar extension, as F, and the pivot of the jaws extended to form a treadle-bar, E, projecting at an angle with the plane of opening and closing movement of the jaws, substantially as shown and described.

ROBERT LEMUEL SHAW.

Witnesses:
EDWIN W. MOORE,
A. G. EGBERT.